United States Patent Office 3,438,598
Patented Apr. 15, 1969

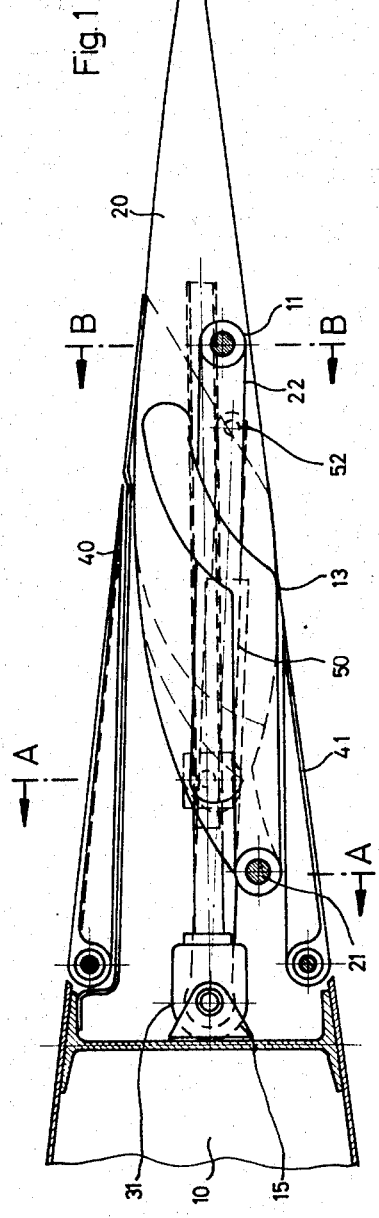
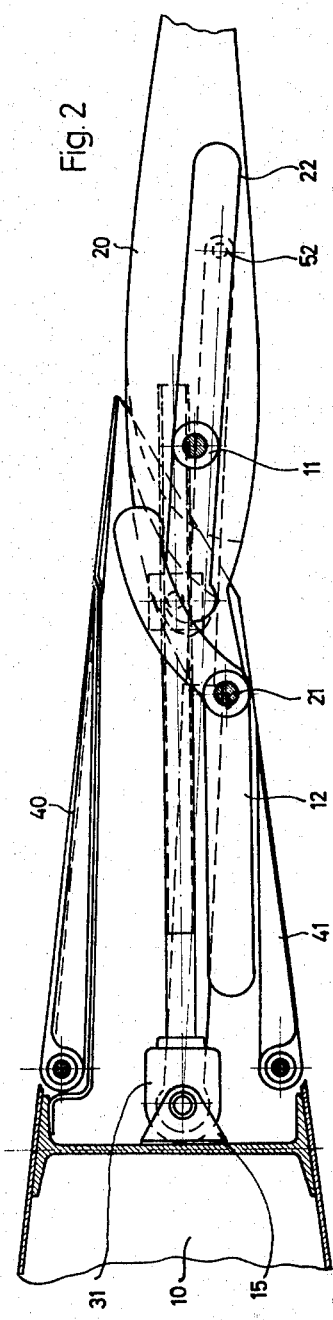

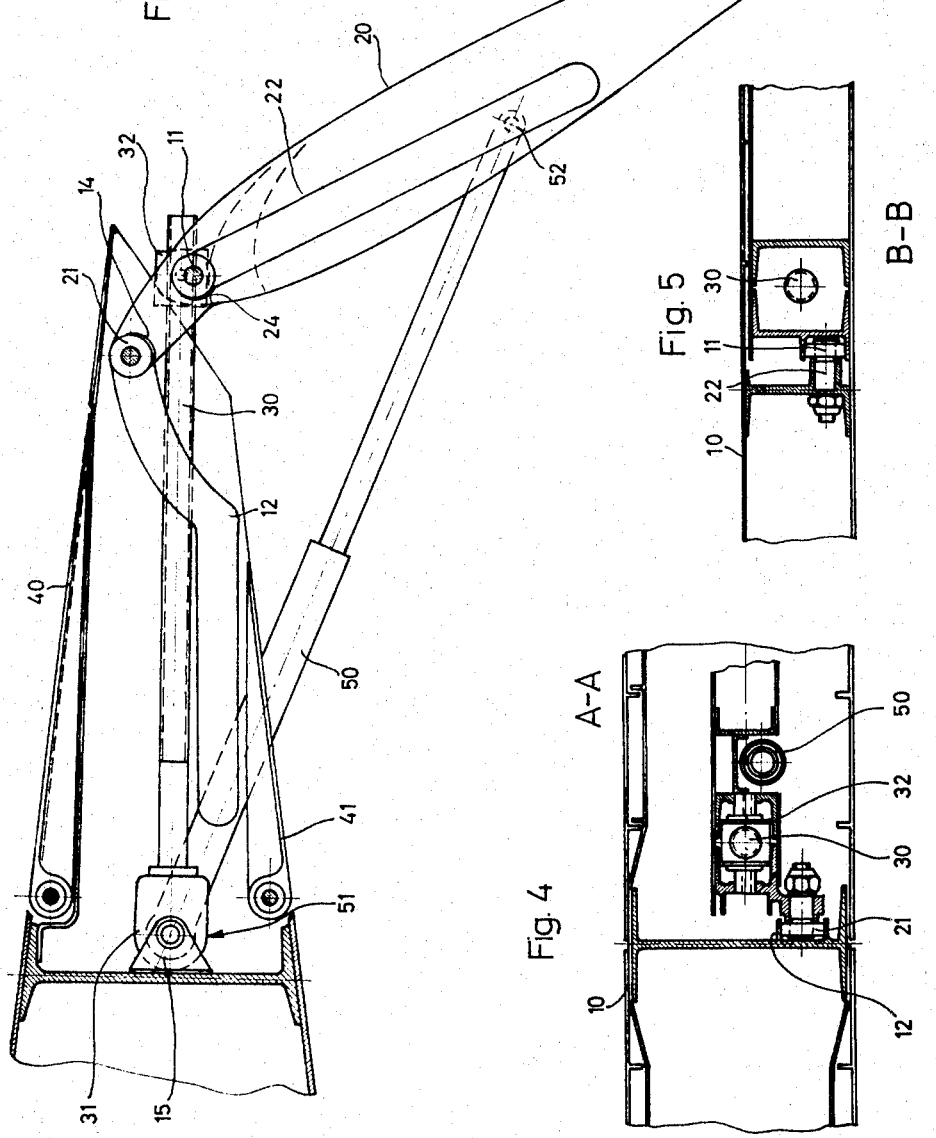

3,438,598
EXTENDABLE WING FLAP ARRANGEMENT FOR AIRPLANES
Karl Vinzenz Tammel, Munich, Germany, assignor to Entwicklungsring Sued GmbH, Munich, Germany, a corporation of Germany
Filed Oct. 13, 1966, Ser. No. 586,498
Claims priority, application Germany, Oct. 27, 1965, E 30,367
Int. Cl. B64c 3/40
U.S. Cl. 244—42       5 Claims

ABSTRACT OF THE DISCLOSURE

In combination with a wing and a wing flap, cooperating means on the wing and flap constituting the support for the flap and including a roller mounted on the flap and movable in a guide mounted on the wing, and a second roller mounted on the wing and movable in a guide mounted on the flap during all movements of the flap. The rollers and guides are disposed so that the flap will move rearwardly and downwardly of the wing.

---

The invention herein relates to an extendable wing flap arrangement for increasing the wing surface area during extension, thereby decreasing the wing load and improving take-off, climbing or landing. Additionally, the camber of the wing profile will be enlarged, thereby improving the lift coefficients. Flaps simultaneously exert a favorable influence on the boundary layer over slits, channels or nozzles.

Flaps are not only exposed to considerable forces in their retracted state, but also in their extended state, and must withstand these forces in all positions. The points at which the flaps are mounted must be able to completely absorb the forces so that reliable operation of the flaps is always assured, regardless of their position.

It is known that flaps are often equipped with slots, channels, slit nozzles or the like, and heretofore support and guidance was provided by using several rollers or gliding rails, arranged at relatively small distances on the flaps, to assure reliable shifting, whereas this arrangement of the small roller made it possible to maintain material stresses within permissible bounds, the resultant forces and momentums required correspondingly increased thicknesses of material increasing expense and weight. Furthermore, the systems required special strengthening, when it was desired to extend the flap to its maximum fanning out position to obtain a maximum effective profile camber, remembering that highest lift values may only be achieved with a maximum of drag forces. The prior art is exemplified by German Patents 643,682, 674,937 and U.S. Patent 2,836,380.

It is recognized that the greatest application of forces is in the end positions of the extendable flaps, and the invention herein directs itself to means for supporting the flap in such manner that the application of forces is as close to its ends as is practical so that the momentum of forces is reduced to a minimum, whereby the wall thicknesses of the entire construction may be substantially reduced.

According to the invention herein, an extendable airplane wing flap arrangement, which, when not extended, is housed within the wing profile and is extended therefrom by suitable means and in such manner that controlled guidance by co-operating rollers and tracks lying perpendicular along planes in relation to the Y-axis of the airplane in each plane results. This is accomplished generally by one roller fixed to the flap and moving in a guidance means fixed to the wing, and with guidance means fixed to the flap moving relative to a roller fixed to the wing.

Additionally, the invention contemplates the provision of a flap extending gear mechanism and a telescopic strut for the support of the flap in its extended position, and with the forward ends of each being mounted with their axis in co-axial relationship.

The invention will be fully understood from the following description of the preferred embodiment thereof, by reference to the drawings, wherein:

FIGURE 1 shows a cross-section of the flap arrangement, partially diagrammatic, and in retracted position;

FIGURE 2 shows an arrangement similar to FIGURE 1, with the flap, which is partially broken off, extended but not fully swung out;

FIGURE 3 shows a flap arrangement similar to FIGURE 2, partly diagrammatically, with the flap fully swung out;

FIGURE 4 shows a section on the line A—A of FIGURE 1;

FIGURE 5 shows the section on the line B—B of FIGURE 1, and as would be seen if FIGURE 1 were not partially in section.

Referring to the drawings, there is shown an airplane wing 10 of well-known construction, the trailing edge of which is provided with an opening or contour for the reception of a flap 20, the wing having upper and lower spoilers 40, 41 to maintain the contour thereof. Mounted on the lobe at the leading edge of the flap is a roller 21 which co-operates with a guide means or rail 12 mounted on the wing, and as best seen in FIGURES 2 and 3, the guide means 12 extend rearwardly and then upwardly and rearwardly; and in flap retracted position, the roller 21 is at the forward end of the guide. Spaced rearwardly, and at the maximum distance possible from the forward end of the guide 12 is a second roller 11 which is mounted on the wing (see FIGURE 5). Co-operating with the roller 11 is a straight line guide means or rail 22, fixed to the flap whereby the flap may move relative thereto, and in flap retracted position the roller 11 is at the trailing end of the guide. The rollers 21 and 11 and their guides 12 and 22 provide co-operating means for extending or moving the flap rearwardly and then pivoting it clockwise to downward position and also totally support the flap 20; the guide means being closed at each end thus limiting the relative movements of the flap and wing.

Rearward movement of the flap may be accomplished in any suitable manner, therebeing shown herein a gear mechanism comprising a threaded spindle 30 rotatable by power means, not shown, and carrying thereon a swivel nut 32. The forward end 31 of the spindle 30 is pivotally mounted with its axis in a horizontal plane in a suitable bracket means 15 secured to a spanwise wing bulkhead, with the spindle otherwise supported in the traveling swivel nut 32 universally mounted thereon and pivotally connected to the flap 20, adjacent the leading edge thereof, somewhat rearwardly of roller 21.

From the foregoing, it is seen that when the flap 20 is in retracted position, the roller 21 is relatively close to the spanwise bulkhead and the mounting for spindle 30, whereas the roller 11 is spaced rearwardly almost the full extent of the spindle 30 and as close to the trailing edge of the wing as is practical and rearwardly of the vertical center of the flap. When in this position, the flap mounted roller 21 is at the forward end of the wing mounted guide or rail 12, whereas wing mounted roller 11 is at the trailing end of the flap mounted guide means or rail 22. Upon operation of the spindle 30, the flap 20 and the roller 21 will be moved rearwardly substantially horizontally in the horizontal leg of guide means 12. Simultaneously, the roller 11 is moving forwardly relative to the flap mounted guide means 22. Upon roller 21 reaching the position shown in FIGURE 2, further movement causes it to move upwardly and rearwardly in the arched leg of the guide means 12, pivoting flap 20 on roller 21 as well as moving it relative thereto until the parts have assumed the position shown in FIGURE 3 with the flap in downward position.

To further assist in resisting the acting forces on the flap, there is provided a telescopic member 50 having its forward end 51 coaxially and pivotally mounted in bracket 15 adjacent the forward end 31 of spindle 30, and having its outer end pivotally connected to the flap 20 adjacent the trailing end of the rail 22 (FIGURE 3). When the flap is fully extended, the pivot points of strut 50, spindle 30 and flap 20 form a triangle with the strut as the base and provide a brace for the flap 20.

From the foregoing, it is apparent that the aerodynamic forces acting on the flap are transmitted to the wing through the rollers 11 and 21, in all positions of the flap. In the full open or downward position of the flap as shown in FIGURE 3, in which position the greatest forces occur, the forces will in part be transmitted from the flap to the spanwise bulkhead through the strut 50, and the forces are thus transmitted to widely separated points on the wing even through the distance between rollers 11 and 21 has been diminished.

If desired, transmission of forces may be accomplished either through roller 11 or roller 21 as selected. This may be accomplished by making the associated guide means of such length that the selected roller does not seat against the end of the guide means, thus providing limited play therebetween.

In accordance with the teachings herein, maximum safety is achieved in the constructural elements of the plane by relatively simple means, so positioned that when the constructional elements are exposed to very great forces the flap may still be shifted quickly and reliably at all times. As compared to the know designs, additional levers, rod systems and similar things, subject to vibrations at the very trailing edges of the wings, are eliminated. The introduction of force, which hitherto had been statically uncertain, has also been eliminated.

The following is claimed:
1. In combination a wing and a wing flap co-operating means on the wing and flap constituting the support for the flap and comprising a roller mounted on the flap and movable in a first guide mounted on the wing, and a second roller mounted on the wing and movable in a second guide mounted on the flap, said second roller cooperating with said second guide during all movements of said flap, said rollers and guides being so disposed that the flap will move rearwardly and then downwardly, and means for moving said rollers and guides relative to one another.

2. The combination defined in claim 1 wherein said first roller is mounted adjacent the forward end of the flap and the second roller is mounted adjacent the trailing edge of the wing.

3. The combination defined in claim 1 wherein said means for moving said rollers and guides relative to one another comprises a threaded spindle pivotally mounted on the wing forward of the flap, a universal nut movable on the spindle and pivotally connected to the flap adjacent the forward end thereof, said spindle maintaining a substantially fixed angular relationship with said wing during all movements of said flap.

4. The combination defined in claim 1 including a telescoping strut having one end pivotally mounted on the wing and its other end pivotally mounted on the flap.

5. The combination defined in claim 3 including a telescoping strut having one end pivotally connected to the wing co-axial with the pivot of the threaded spindle and the other end pivotally connected to the flap approximately mid-point between its leading and trailing edges.

References Cited

UNITED STATES PATENTS

| | | | |
|---|---|---|---|
| 2,202,430 | 5/1940 | Rebeski | 244—42 |
| 2,226,811 | 12/1940 | Evans | 244—42 |
| 2,502,315 | 3/1950 | Earhart | 244—42 |
| 2,526,929 | 10/1950 | Bowcott | 244—42 |
| 2,614,774 | 10/1952 | Donovan | 244—42 |
| 2,624,532 | 1/1953 | Butler | 244—42 |
| 2,661,166 | 12/1953 | Gordon | 244—42 |
| 2,688,455 | 9/1954 | Clark | 244—42 |
| 2,836,380 | 5/1958 | Pearson | 244—42 |

FERGUS S. MIDDLETON, *Primary Examiner.*

J. L. FORMAN, *Assistant Examiner.*